US005633071A

United States Patent [19]
Murphy

[11] Patent Number: 5,633,071

[45] Date of Patent: May 27, 1997

[54] INTEGRATED LABEL MAILER

[75] Inventor: Sharon M. Murphy, Northbrook, Ill.

[73] Assignee: Moore Business Forms, Inc., Grand Island, N.Y.

[21] Appl. No.: 519,978

[22] Filed: Aug. 28, 1995

[51] Int. Cl.[6] .......... B32B 3/00

[52] U.S. Cl. .......... 428/195; 428/40.1; 428/42.2; 428/43; 428/174; 428/411.1; 428/488.4; 283/81; 283/109

[58] Field of Search .......... 428/195, 42, 43, 428/76, 174, 187, 481, 537.5, 40.1, 42.2, 411.1, 488.4; 283/81, 109

[56] References Cited

U.S. PATENT DOCUMENTS

| | | | |
|---|---|---|---|
| 2,985,464 | 5/1961 | McFarland . | |
| 3,937,492 | 2/1976 | Biron . | |
| 4,784,317 | 11/1988 | Chen et al. . | |
| 4,801,074 | 1/1989 | Ikeda . | |
| 4,900,597 | 2/1990 | Kurtin . | |
| 4,915,287 | 4/1990 | Volk et al. . | |
| 5,098,131 | 3/1992 | Tucker . | |
| 5,129,682 | 7/1992 | Ashby . | |
| 5,193,850 | 3/1993 | Lombardo . | |
| 5,288,014 | 2/1994 | Meyers et al. . | |
| 5,320,276 | 6/1994 | Van Malderghem et al. | 229/92.1 |
| 5,324,153 | 6/1994 | Chess . | |
| 5,348,780 | 9/1994 | Boggs et al. . | |
| 5,366,410 | 11/1994 | Lombardo . | |
| 5,441,796 | 8/1995 | Steidinger et al. . | |
| 5,486,021 | 1/1996 | Laurash | 283/81 |

*Primary Examiner*—William Krynski
*Attorney, Agent, or Firm*—Nixon & Vanderhye P.C.

[57] ABSTRACT

An intermediate and a mailer-type business form are provided in which at least about 50% of a sheet forming the intermediate is of label stock. Portions of the release liner of the label stock are removed to edge seal the intermediate into a mailer by folding it about one or more fold lines, and the outgoing and return address indicia are reverse printed on the release sheet in alignment with removable (e.g. die cut) portions of the paper sheet, the addresses being exposed upon removal of the die cut label stock paper sheet portion at the reverse printed address portions. Other labels may also be die cut from the label stock.

23 Claims, 4 Drawing Sheets

FIG. 5
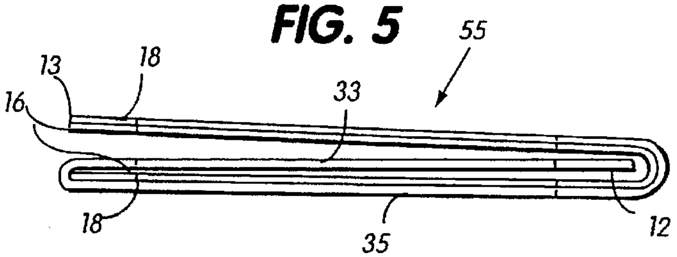
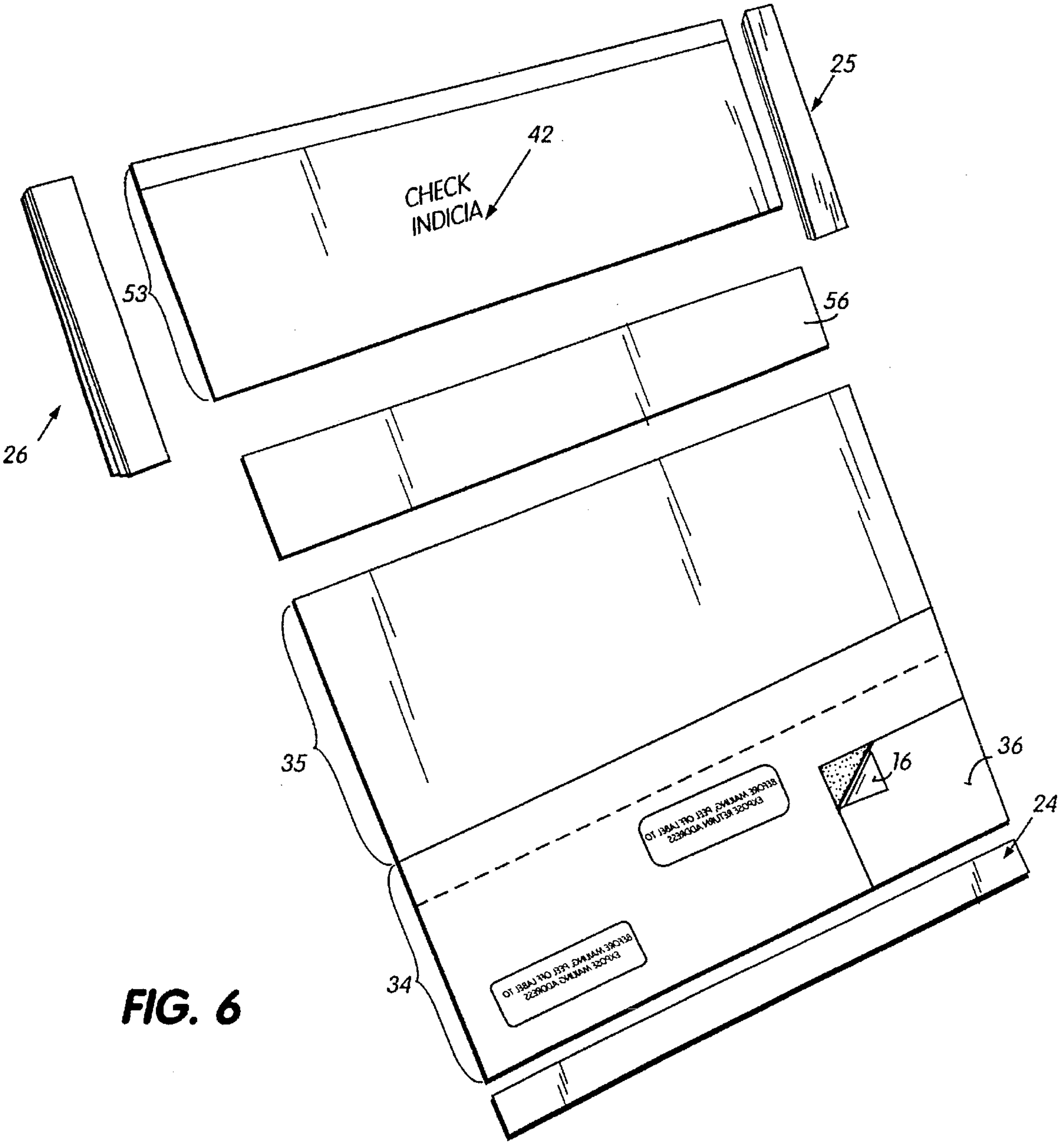
FIG. 6

INTEGRATED LABEL MAILER

BACKGROUND AND SUMMARY OF THE INVENTION

There are many relatively small businesses that produce many types of business forms, such as monthly payment checks and corresponding vouchers, by laser printing and then stuff the form into a window envelope. It is desirable to be able to eliminate the window envelope using a self-mailer, however as a practical matter that may be difficult to do for many small business uses, since typical procedures (such as utilizing pressure cohesive such as in systems sold by Moore Business Forms, Inc. of Lake Forest, Ill. to effect pressure sealing) for producing laser mailer documents are relatively expensive and complex. In addition, in these small business applications, the user of the self mailers may have difficulty in forming the mailer properly. This is due to a number of folding or sealing instructions which may seem confusing to the user the first several times the user attempts to complete the mailer.

According to the present invention a simple intermediate for a mailer-type business form, and a mailer-type business form made from the intermediate, are provided which eliminate window envelopes, and allow small businesses to use essentially the same basic construction of their existing business forms, such as monthly payment checks, and allows them to be handled on a simplex laser printer (a duplex printer not necessary). These desirable results are obtained according to the present by forming at least about 50% of the form of label stock, die cutting removable portions out of the paper part of the label stock, and printing (e.g. reverse printing) address indicia on those portions of the release liner of the label stock underlying the removed portions. Other labels can also be die cut out of the label stock portion of the form. Thus when the intermediate is folded into the mailer-type business form address information is readily exposed. The invention is simple to construct, eliminates the need for any security printing even when the business forms are negotiable instruments such as checks, eliminates the need for window envelopes, and can be handled by the type of equipment normally found in small businesses, including simplex laser printers.

According to one aspect of the present invention an intermediate for a mailer-type business form is provided, comprising the following components: A substantially quadrate sheet of paper having first and second substantially parallel end edges, and third and fourth substantially parallel side edges, and first and second faces. A pressure sensitive adhesive covering an area of at least about 50% of said first face between said third and fourth edges, and from said second edge toward the first edges, in a substantially quadrate configuration. A release sheet having an inner face substantially covering the adhesive and having an outer face not engaging the adhesive. A first line of weakness substantially parallel to and adjacent, but spaced from, the second edge, and second and third lines of weakness substantially parallel to and adjacent, but spaced from, the third and fourth edges, respectively, to define tear-off edge portions in both the paper sheet and release sheet. And, a first removable portion of the paper sheet closer to the second edge than the first edge and substantially completely within the area of the paper sheet covered by the adhesive and release sheet.

The release sheet is preferably transparent or translucent, and the intermediate preferably further comprises first reverse address indicia on the release sheet outer face aligned with the first removable portion and visible because of the transparent or translucent nature of the release sheet. A second removable portion of the paper sheet and second reverse address indicia on the release sheet outer face aligned with the second removable portion may also be provided. For example the address indicia may be outgoing and return address indicia. The removable portions may be die cut from the paper sheet, and at least one label may also be die cut in the sheet of paper overlying the release sheet.

The intermediate also typically comprises first and second fold lines substantially parallel to the first and second edges and dividing the paper sheet into three substantially equal size panels. These become separate plies upon folding of the intermediate into mailer configuration. Under these circumstances the adhesive and release sheet typically cover about two-thirds of the paper sheet, substantially the entire area between the second edge and the first fold line. Die cut lines may also be formed in the release sheet between the ends substantially parallel to the first through third lines of weakness and the second through fourth edges, respectively, facilitating detachment of edge portions of the release sheet.

The invention also relates to a mailer-type business form comprising the following components: A substantially quadrate first ply substantially only of paper. A substantially quadrate second ply comprising a paper portion and a transparent or translucent release liner portion held together in face-to-face relationship by pressure sensitive adhesive; and edge portions of the adhesive uncovered by the release liner portion and holding the paper portion to the first ply at the edge portions. A first bare portion of the release sheet surrounded by the paper portion and adhesive of the second ply. And, first address indicia on the release sheet first bare portion [and visible because of the transparent or translucent nature of the release liner].

Typically the release liner portion has an inner face in face-to-face contact with the first ply, and the first address indicia is reverse indicia on the release liner inner face. A second bare portion of the release sheet may also be provided, and second address indicia reverse printed on the release liner inner face at the second bare portion. Edge portions of the third ply adhesive are uncovered by the release sheet, and hold the paper portion of the third ply to the first ply, the first ply sandwiched between the second and third plies. Lines of weakness are also typically formed in the first and second plies for detachment of edge portions of the plies from each other to allow opening of the mailer (such lines of weakness also provided in the third ply when a third ply is provided). At least one label is typically formed from the second ply and die cut in the paper portion of the first ply.

While the invention is particularly useful when the intermediate is an 8½×11 inch sheet forming a three ply mailer, the techniques and features of the invention are equally applicable to two ply final business forms, four ply final business forms, or other multiple ply business forms.

It is the primary object of the present invention to provide a simple yet effective intermediate for a mailer-type business form and mailer produced from the form. This and other objects of the invention will become clear from an inspection of the detailed description of invention and from the appended claims.

BRIEF DESCRIPTION OF THE DRAWINGS

FIG. 5 is a side schematic view, with the thicknesses greatly enlarged for clarity of illustration, of a business form according to the present invention after folding of the intermediate of FIGS. 1 through 3 as indicated in FIG. 4; and FIG. 6 is a top perspective view of the mailer of FIG. 5 after opening thereof.

DETAILED DESCRIPTION OF THE DRAWINGS

Figure 1:
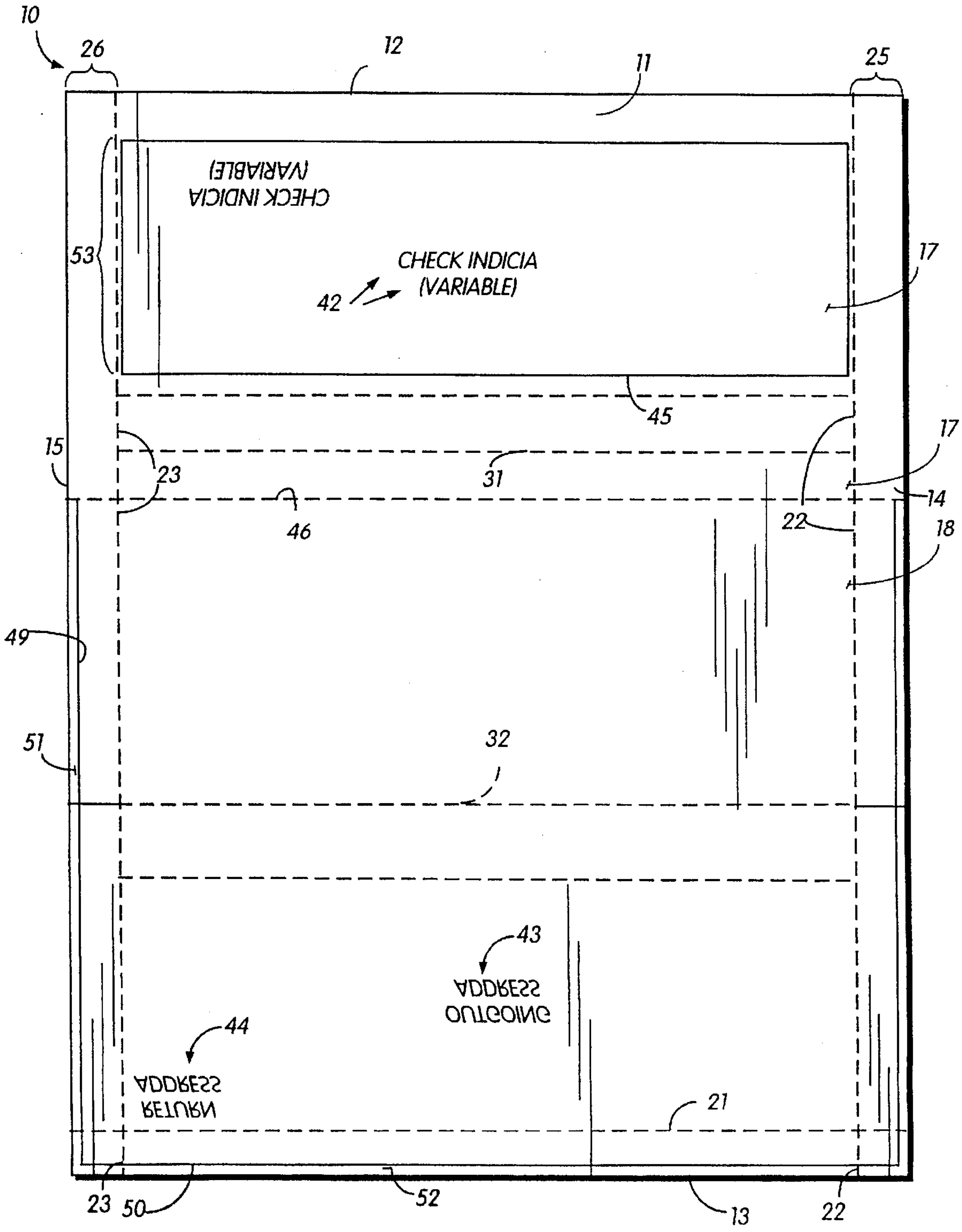
FIG. 1 is a top plan view of a first face of an intermediate for a mailer-type business form according to the present invention.
Figure 2:
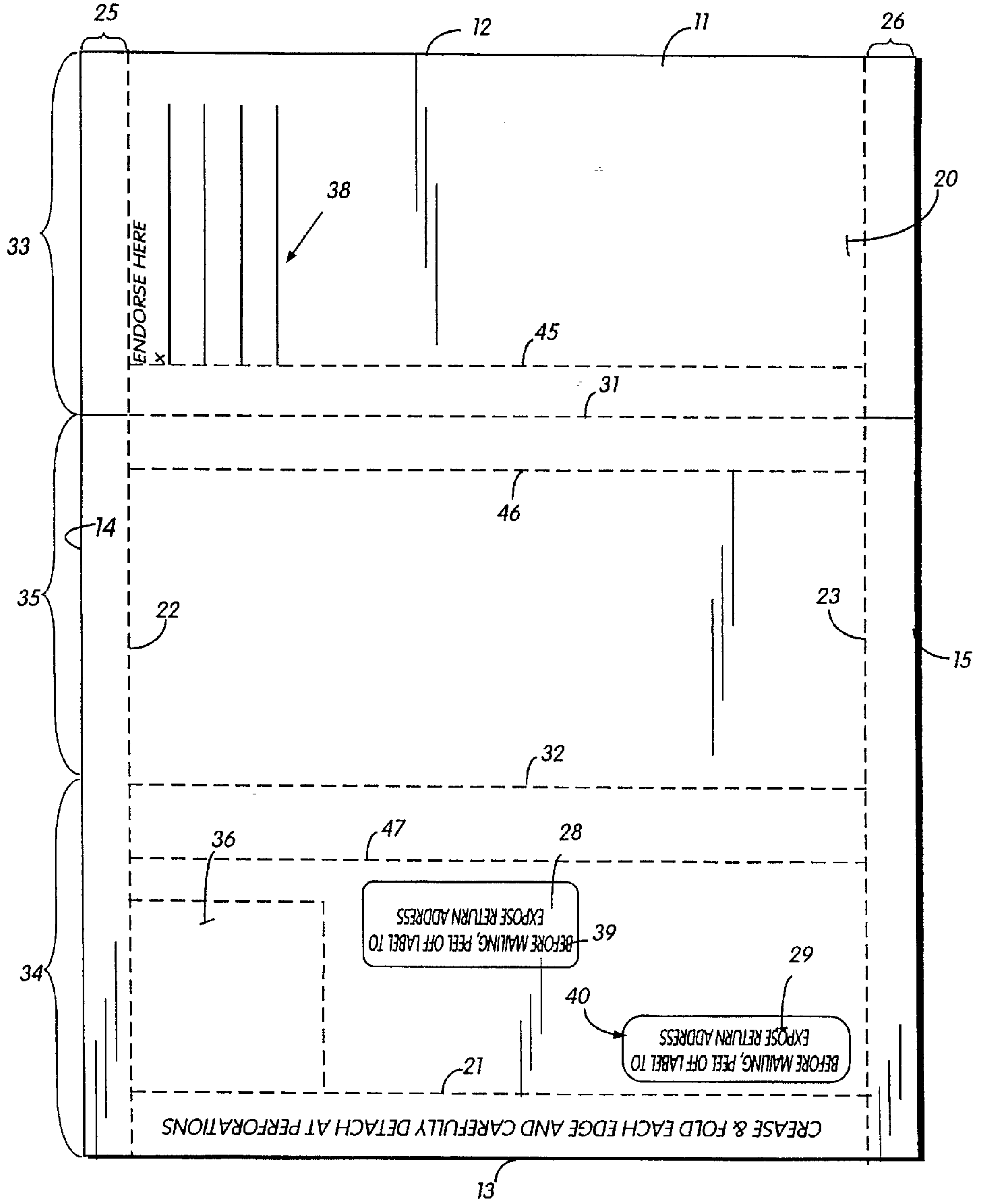
FIG. 2 is a top plan view of the second face of the form of FIG. 1.
Figure 3:
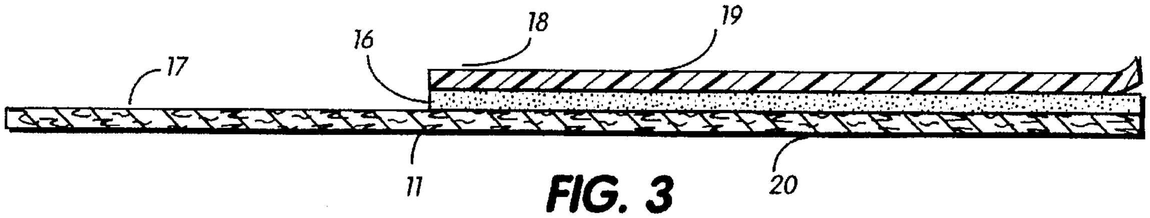
FIG. 3 is a side view, with the portions greatly enlarged in thickness for clarity of illustration, of the intermediate of FIGS. 1 and 2.

An exemplary intermediate for a mailer-type business form is shown generally by reference numeral 10 in FIGS. 1 through 3. The intermediate 10 includes a substantially quadrate sheet of paper 11 having first and second substantially parallel end edges 12, 13 and third and fourth substantially parallel side edges 14, 15, the side edges 14, 15 being substantially perpendicular to the end edges 12, 13. A pressure sensitive adhesive (either permanent or repositional, but preferably permanent) 16 covers an area of at least about 50% of the first face 17 (see FIG. 1). Approximately 50% coverage would be for an intermediate that was folded into a two ply form; for a three ply form such as illustrated in the drawing the adhesive 16 covers about two-thirds of the first face 17.

The adhesive 16 is covered by a transparent or translucent release sheet or liner 18. Typically the release sheet or liner 18 is of conventional construction, such as silicone coated, on the portion (inner face) thereof that engages the adhesive, and completely covers the adhesive 16 at least during printing of the intermediate 10, such as in a laser printer, so that the adhesive will not harm the printing equipment or inadvertently stick to other objects. The release liner 18 includes an outer face which does not engage the adhesive 16, rather facing outwardly therefrom.

The intermediate 10 also includes a second face 20 (see FIGS. 2 and 3), the face 20 typically being completely of paper.

The intermediate 10 further comprises a first line of weakness 21 substantially parallel to and adjacent the second edge 13, and second and third lines of weakness 22, 23 substantially parallel to and adjacent the third and fourth edges 14, 15, respectively, to define tear-off edge portions 24–26 (see FIG. 2 in particular) in both the paper sheet 11 and release liner 18. The second and third lines of weakness 22, 23 extend nearly to the end edge 13. However, ties 22' and 23' are left at each edge to insure integrity of the form when being fed through the printer.

A first removable portion 28 (see FIGS. 2 and 4 in particular) of the paper sheet 11 is provided closer to the second edge 13 than the first edge 12 and substantially completely within the area of the paper sheet 11 covered by the adhesive 16 and release sheet 18. The removable portion 28 is preferably die cut out of the sheet 11 normally after the adhesive 16 and release sheet 18 have been applied thereto, but possibly before (if small die bridges are left). Under some circumstances the removable portion 28 is formed from lines of weakness such as perforations. Typically two removable portions (also see second removable portion 29 in FIGS. 2 and 4) are provided, both die cut out of the sheet 11, the removable portions 28, 29 being disposed at conventional areas for outgoing and return addresses, respectively, for a mailer type business form constructed from the intermediate 10. Since the adhesive 16 has a higher affinity for the paper sheet 11 than for the release liner 18, when the removable portions 28, 29 are removed the adhesive sticks to them and is released from liner 18. The release liner is sufficiently transparent or translucent so that the address indicia are visible when the portions 28, 29 are removed (see FIG. 4). To insure that portions 28, 29 are removed by the user, they may have a color (red) applied to them so so as to distinguish the portions from the rest of the form.

There is also a first fold line 31, and an optional second fold line 32 parallel to the edges 12, 13, and forming the intermediate 10 into, a first panel 33, a second panel 34, and a third panel 35 between the panels 33, 34, as illustrated in FIG. 2. The panels 33 through 35 ultimately become plies of the mailer type business form formed from the intermediate 10 when folded about the fold lines 31, 32. The fold lines 31, 32 may be any conventional fold lines such as creases, score lines, perforations, or other lines of weakness. Fold line 31 is preferably a line of perforations so as to allow the user to separate panel 33 from the remainder of the mailer. If other perforations are used, perf line 31 will typically be weaker to allow easy separation. In addition, the fold line may be colored so as to draw the user's attention to it, to insure proper separation.

The intermediate 10 also typically includes at least one other additional label die cut or otherwise formed out of the label stock portion (panels 34, 35) thereof, such as the label 36 illustrated in FIG. 2. Other labels can be formed in any other parts of the label stock panels 34, 35 of the intermediate 10.

The intermediate 10 is typically supplied to a small business or other user who desires to make mailer type business forms. The user rims the intermediate 10 through his/her printer, such as a laser printer, only a simplex (not duplex) printer being necessary to properly add variable information according to the invention. The invention will be hereinafter described with respect to a check being the primary business form aspect of the invention, however it is to be understood that any type of business form may be utilized in accordance with the teachings of the invention.

For the embodiment illustrated in FIG. 2, the endorsement information/indicia 38 is typically preprinted on the intermediate 10 before being supplied to the user, and the removable portions 28, 29 and the label 36—as well as all perforations and the like—are preformed in the intermediate 10, and the instruction indicia 39, 40, is also typically non-variably printed thereon. This printing is all on the paper second face 20 of the intermediate 10 as illustrated in FIG. 2.

Figure 4:
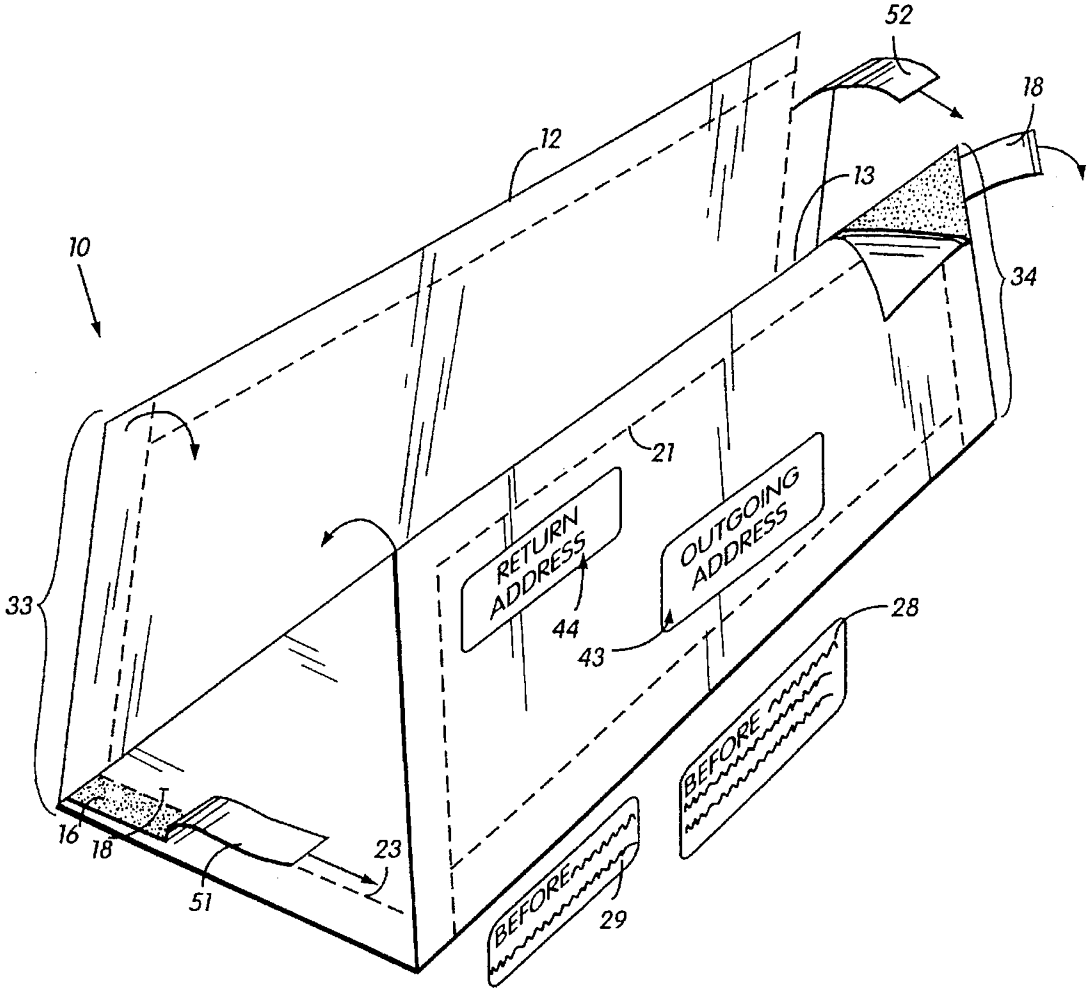
FIG. 4 is a top perspective view showing the intermediate of FIGS. 1 through 3 being folded to form a final business form, with portions of the release liner being removed to expose adhesive that will hold the portions of the intermediate together to form the final business form.

Variable data will be printed by the user's printer on the first face 17 of the intermediate 10, as illustrated in FIG. 1. For example the check indicia that is variable, which may be printed in any orientation, such as illustrated schematically by the indicia 42 in FIG. 1, is printed on the paper portion of the face 17, while the address indicia 43, 44 is printed on the release sheet portion of the first face 17. So that the indicia 43, 44 is readable once the removable portions 28, 29 have been removed, the indicia 43, 44 is reverse printed by the printer at the user site, as illustrated in FIG. 1. As seen in FIG. 4, the indicia is readily readable then after removal of the portions 28, 29, due to the transparent/translucent nature of the release liner 18.

The intermediate 10 may also be provided with various other lines of weakness, such as the lines of weakness 45, 46, and 47, for facilitating detachment of various portions oft he intermediate 10 from each other after the final mailer is opened. Also, there may be die cut lines—such as illustrated at 49 and 50 in FIG. 1—between the edges and the lines of weakness (e.g. the die cut 49 between the edge 15 and the line of weakness 23 and the die cut line 50 between the line of weakness 21 and edge 13) which may facilitate detachment of edge portions 51, 52 of the release liner 18 to hold the mailer that is to be formed together after folding without taking a chance of tearing the underlying paper sheet 11 if detachment along the perforation lines 21, 23 is attempted. The die cuts 49, 50 are inset from the edge ⅜" so that they are not caught by the printer and prematurely peel off. The edge portions to be removed 51, 52 are preferably shaded or colored (e.g. blue) so that the user will know which portions to remove. Of course such die cut lines 49, 50 can also be provided between the edge 14 and the line of weakness 22, but that is not shown on the right hand side of FIG. 1 merely for the purpose of illustrating different options.

After the variable indicia 42–44 has been printed on the face 17, such as the recipient of the check 53 that is part of the intermediate 10 as the outgoing addressee, and the return address of the user as the return addressee, and various payment indicators or amounts for the indicia 42, the intermediate 10 is ready to be formed into a mailer. This is accomplished by removing the edge portions 51, 52 as well as a portion or all of the release liner 18 between the edge 14 and the perforation line 22, exposing the underlying pressure sensitive adhesive 16. Each of these removable portions are highlighted or colored so that the user knows to readily remove these portions without referring to the instructions. Then folding the panel 33 in first so that the face 17 thereof engages the exposed adhesive 16 adjacent the edges 14, 15 of the third panel 35, and then folding the second panel 34 downwardly as illustrated in FIG. 4 so that the exposed adhesive 16 thereof adjacent the edges 13 through 15 engages the second face 20 of the panel 33. The exposed adhesive adjacent the edge 13 will engage that part of face 20 between the lines of weakness 31, 45. The final mailer produced by the folding action of the intermediate 10, as illustrated in FIG. 4, is shown schematically at 55 in FIG. 5. The first through third panels 33 through 35 become the first through plies 33–35 with the exposed adhesive along the edges holding the mailer 55 together at the edges. The indicia 43, 44 is readily visible, but did not have to be printed on the face 20 of the third panel 33 which would be difficult to do because duplex printing would be necessary, and which also would be undesirable in this particular situation because of the nature of the document (check) 53.

When the mailer 55 is received by the outgoing addressee (43), he or she opens it up by tearing at the perforation lines 22, 23 and 21 (which is aligned with the perforation lines 45, 46 after the folding action illustrated in FIGS. 4 and 5), the separated edges being illustrated at 25 and 26 in FIG. 6. The strip 56 between the perforation lines 45, 46 is also detached. The bulk of the remaining plies, shown at 34 and 35 in FIG. 6, will typically be discarded although useful information may be printed thereon and one or more labels 36 associated therewith may be removed and the labels (depending upon the indicia thereon or other circumstances) can be used as desired.

Note that since the release liner 18 covers at least the majority of the panels/plies 34, 35 and is relatively opaque when folded into a mailer configuration as illustrated at FIG. 5 (even though it may be translucent if by itself), there is no need for security printing as is typically done when mailers include negotiable instruments like the check 53, yet one holding the mailer 55 up to the light would not be able to see inside it.

The sheet 11 (intermediate 10) illustrated in the drawings of the exemplary embodiment described above is preferably 8½×11 inches, however other dimensions may also be provided. For example out of a legal size sheet a four ply mailer may be constructed, typically with about half of the mailer (although three-quarters of it could be) covered by a release sheet 18 and adhesive 16. Other configurations, such as two ply mailers (in which about 50% of the sheet 11 is covered by the adhesive 16 and release liner 18), or even more than four plies constructions, may be provided. Also other indicia, die cuts, perforations, or cut outs may be provided depending upon the particular use to which the intermediate 10 and mailer 55 are to be put.

It will thus be seen that according to the present invention a simple yet effective intermediate for a mailer type business form that has the ability to be simply and easily produced utilizing a simplex printer, which does not require a window envelope, and which has inherent security, as well as great versatility in the number of different components (particularly label components) that may be employed, is provided. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent structures and devices.

What is claimed is:

1. An intermediate of a mailer-type business form comprising:

a substantially quadrate sheet of paper having first and second substantially parallel end edges, and third and fourth substantially parallel side edges, and first and second faces;

a pressure sensitive adhesive covering an area of at least about 50% of said first face between said third and fourth edges, and from said second edge toward said first edges, in a substantially quadrate configuration;

a release sheet having an inner face substantially covering said adhesive and having an outer face not engaging said adhesive;

a first line of weakness substantially parallel to and adjacent said second edge, and second and third lines of weakness substantially parallel to and adjacent said third and fourth edges, respectively, to define tear-off edge portions in both said paper sheet and release sheet; and a first removable portion of said paper sheet closer to said second edge than said first edge and substantially completely within the area of said paper sheet covered by said adhesive and release sheet.

2. An intermediate as recited in claim 1 wherein said release sheet is transparent or translucent, and further comprising first reverse address indicia on said release sheet outer face aligned with said first removable portion.

3. An intermediate as recited in claim 2 further comprising a second removable portion of said paper sheet, and second reverse address indicia on said release sheet outer face aligned with said second removable portion.

4. An intermediate as recited in claim 3 further comprising at least one fold line substantially parallel to said first and second edges.

5. An intermediate as recited in claim 3 further comprising first and second fold lines substantially parallel to said first and second edges, dividing said paper sheet into three substantially equal size panels.

6. An intermediate as recited in claim 5 wherein said adhesive and release sheet cover about two thirds of the paper sheet, substantially the entire area thereof between said second edge and said first fold line.

7. An intermediate as recited in claim 3 further comprising die cut lines formed in said release sheet between and substantially parallel to said first through third lines of weakness and said second through fourth edges, respectively, facilitating detachment of edge portions of said release sheet, said edge portions shaded or colored to be clearly visually distinct from the rest of said release sheet.

8. An intermediate as recited in claim 3 wherein said reverse address indicia comprise reply and outgoing addresses for a mailer made from said intermediate.

9. An intermediate as recited in claim 3 farther comprising die cut lines formed in said release sheet between and substantially parallel to said first through third lines of weakness and said second through fourth edges, respectively, facilitating detachment of edge portions of said release sheet.

10. An intermediate as recited in claim 1 further comprising at least one fold line substantially parallel to said first and second edges.

11. An intermediate as recited in claim 1 further comprising first and second fold lines substantially parallel to said first and second edges, dividing said paper sheet into three substantially equal size panels.

12. An intermediate as recited in claim 11 wherein said adhesive and release sheet cover about two thirds of the paper sheet, substantially the entire area thereof between said second edge and said first fold line.

13. An intermediate as recited in claim 1 wherein said paper between said first edge and said adhesive and release liner comprises a business form.

14. An intermediate as recited in claim 1 further comprising at least one label die cut in said sheet of paper overlying said release sheet.

15. An intermediate as recited in claim 1 wherein said removable portion is die cut from said paper sheet.

16. A mailer-type business form comprising:

a substantially quadrate first ply substantially only of paper;

a substantially quadrate second ply comprising a paper portion and a transparent or translucent release liner portion held together in face-to-face relationship by pressure sensitive adhesive; and edge portions of said adhesive uncovered by said release liner portion and holding said paper portion to said first ply at said edge portions;

a first portion of said release liner uncovered by said paper portion and said adhesive but surrounded by said paper portion and adhesive of said second ply; and first address indicia on said release liner first portion.

17. A business form as recited in claim 16 wherein said release liner portion has an inner face in face-to-face contact with said first ply, and wherein said first address indicia is reverse indicia on said release liner inner face.

18. A business form as recited in claim 17 further comprising a second portion of said release liner uncovered by said paper portion and said adhesive, and second address indicia reverse printed on release liner inner face at said second portion.

19. A business form as recited in claim 18 further comprising a third ply comprising a paper portion and a release liner portion held together in face-to-face relationship by third ply pressure sensitive adhesive; and edge portions of said third ply adhesive uncovered by said release liner and holding said paper portion of said third ply to said first ply, said first ply sandwiched between said second and third plies.

20. A business form as recited in claim 16 further comprising a third ply comprising a paper portion and a release liner portion held together in face-to-face relationship by third ply pressure sensitive adhesive; and edge portions of said third ply adhesive uncovered by said release liner and holding said paper portion of said third ply to said first ply, said first ply sandwiched between said second and third plies.

21. A business form as recited in claim 20 further comprising aligned lines of weakness in said first through third plies for facilitating detachment of edge portions of said plies from each other to allow opening of said mailer.

22. A business form as recited in claim 16 further comprising aligned lines of weakness in said first and second plies for facilitating detachment of edge portions of said plies from each other to allow opening of said mailer.

23. A business form as recited in claim 16 further comprising at least one label formed from said second ply, die cut in said paper portion of said first ply.

* * * * *